(12) United States Patent
Sip

(10) Patent No.: US 8,018,793 B2
(45) Date of Patent: Sep. 13, 2011

(54) EDGE DETECTING APPARATUS AND AUTOMATIC DEVICE WITH SAME

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 319 days.

(21) Appl. No.: 12/489,419

(22) Filed: Jun. 22, 2009

(65) Prior Publication Data

US 2010/0172212 A1    Jul. 8, 2010

(30) Foreign Application Priority Data

Jan. 8, 2009 (CN) .......................... 2009 1 0300116

(51) Int. Cl.
*G01S 15/00* (2006.01)
(52) U.S. Cl. ................. 367/96; 367/87; 367/95
(58) Field of Classification Search ............ 367/87, 367/95, 96
See application file for complete search history.

(56) References Cited

U.S. PATENT DOCUMENTS

| | | | | |
|---|---|---|---|---|
| 5,126,946 A | * | 6/1992 | Ko | 700/66 |
| 5,161,126 A | * | 11/1992 | Marcus | 367/99 |
| 5,488,867 A | * | 2/1996 | Dorr | 73/597 |
| 5,565,627 A | * | 10/1996 | Dorr | 73/599 |
| 5,583,828 A | * | 12/1996 | Arai et al. | 367/118 |
| 6,155,117 A | * | 12/2000 | Stevens et al. | 73/643 |
| 2004/0081022 A1 | * | 4/2004 | Arai et al. | 367/124 |
| 2007/0012113 A1 | * | 1/2007 | Ulmer | 73/618 |
| 2007/0241293 A1 | * | 10/2007 | Buisker et al. | 250/559.36 |

OTHER PUBLICATIONS

Seshadri, A.; Pagilla, P.R.; , "Design and Development of a New Edge Sensor for Web Guiding," Sensors Journal, IEEE , vol. 7, No. 5, pp. 698-706, May 2007.*
Elmer, H.; Schweinzer, H.; , "Ultrasonic distance measurement system with a well defined and adjustable detection area," Sensors, 2004. Proceedings of IEEE , vol., no., pp. 437-440 vol. 1, Oct. 24-27, 2004.*
Moita, F.; Nunes, U.; "Multi-echo technique for feature detection and identification using simple sonar configurations" Advanced Intelligent Mechatronics, 2001. Proceedings. 2001 IEEE/ASME International Conference on , p. 389-394 vol. 1, Jul. 2001.*

* cited by examiner

*Primary Examiner* — Thomas Tarcza
*Assistant Examiner* — James Hulka
(74) *Attorney, Agent, or Firm* — Altis Law Group, Inc.

(57) ABSTRACT

An edge detecting apparatus for using in an automatic device and configured for detecting edges of a surface on which the automatic device moves is provided. The edge detecting apparatus includes an emitter, a guiding member, and a receiver. The emitter is configured for emitting projecting signal. The guiding member is around the automatic device. The guiding member and the surface define a signal channel, and the signal channel is configured for guiding the projecting signal to travel around the automatic device, if no edge of the surface exists under the signal channel. The receiver is configured for receiving the projecting signal.

13 Claims, 3 Drawing Sheets

EDGE DETECTING APPARATUS AND AUTOMATIC DEVICE WITH SAME

BACKGROUND

1. Technical Field

The present disclosure relates to detecting apparatus and, particularly, relates to an edge detecting apparatus.

2. Description of Related Art

Many automatic devices, such as robots, dust collectors and toys, employ edge detecting apparatuses to detect edge(s) of a surface on which the automatic devices move. Current edge detecting apparatuses include an emitter and a receiver. The emitter is configured for emitting projecting signals, e.g., light ray or radio wave, to the surface. The receiver is configured for receiving the reflected projecting signals. One of the disadvantages of the current edge detecting apparatuses is an inordinate number of edge detecting apparatuses are required for each device, as a result, the cost of the automatic device increases.

What is needed, therefore, is an edge detecting apparatus to overcome the above mentioned problem.

DETAILED DESCRIPTION

Figure 1:
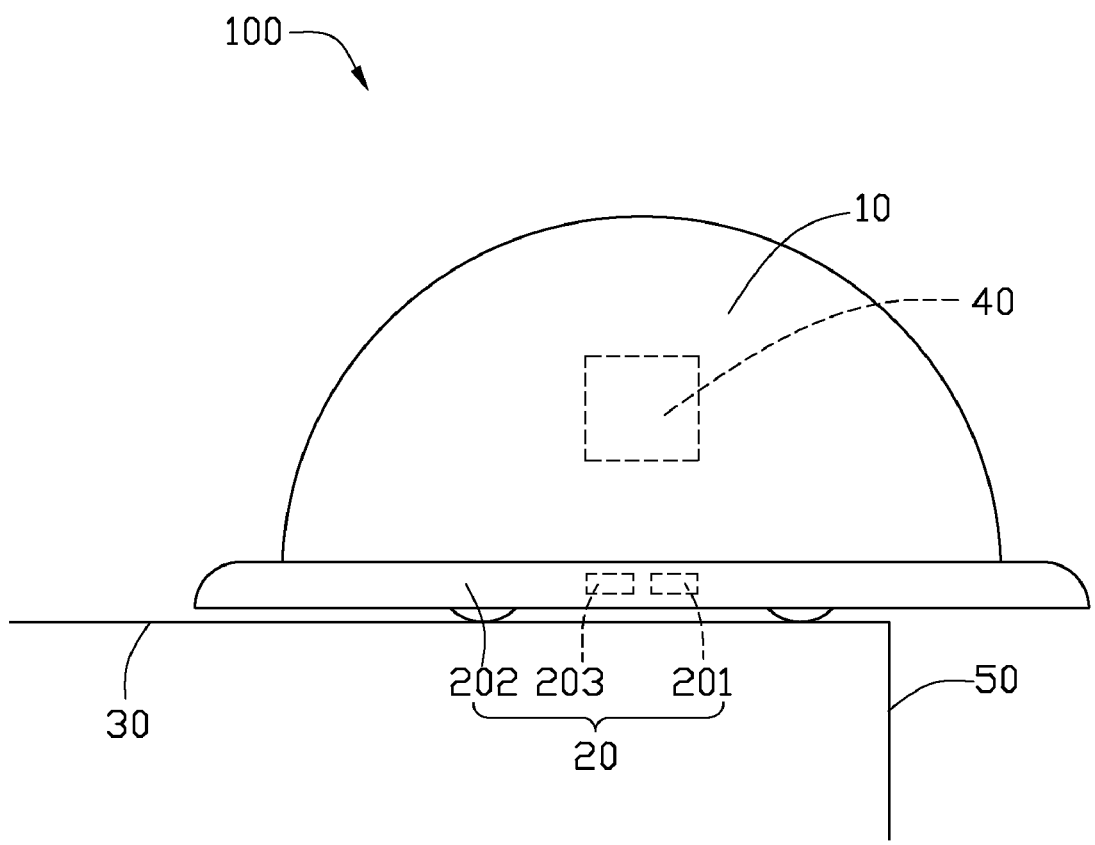
FIG. 1 is a planar, schematic view of an automatic device moving on a surface, according to an exemplary embodiment of the disclosure.

Referring to FIG. 1, an automatic device 100 according to an exemplary embodiment, is shown. The automatic device 100 can automatically move on a surface 30. The automatic device 100 includes a movable main body 10 and an edge detecting apparatus 20.

The edge detecting apparatus 20 includes an emitter 201, a guiding member 202, and a receiver 203.

The emitter 201 is configured for emitting projecting signals, such as infrared rays or ultrasonic waves. The receiver 203 is configured for receiving reflected signals of the projecting signals. In this embodiment, the emitter 201 can be an infrared emitter or an ultrasonic emitter and, the receiver 203 can be an infrared receiver or an ultrasonic receiver respectively.

Figure 2:
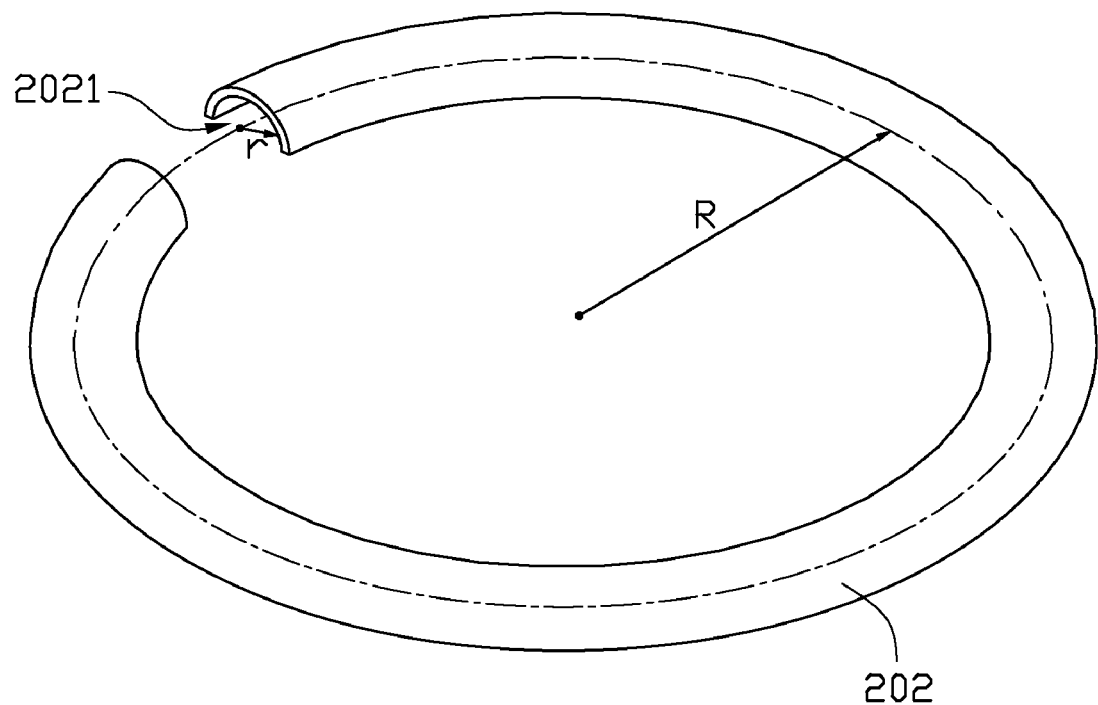
FIG. 2 is an isometric, partially sectioned view of a guiding member of the automatic device of FIG. 1.
Figure 3:
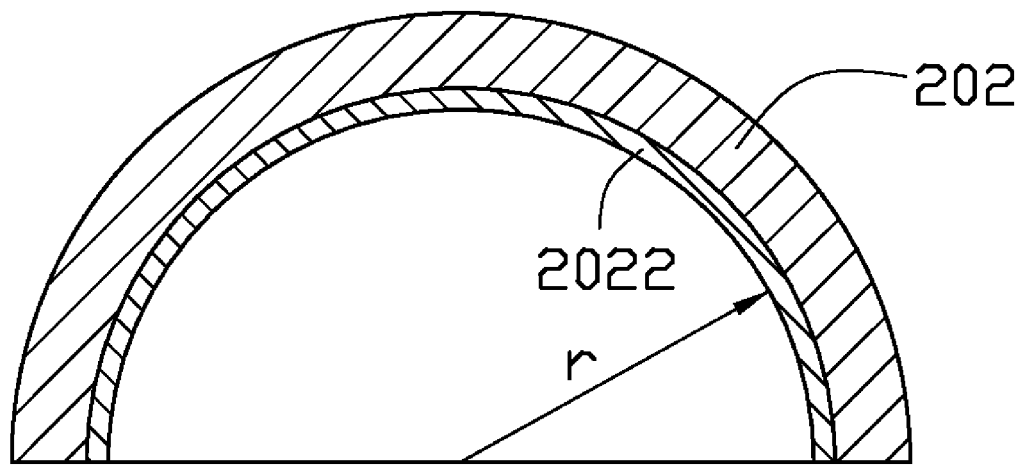
FIG. 3 is a cross-sectional view of the guiding member of FIG. 2.

Referring also to FIG. 2 and FIG. 3, the guiding member 202 is ring-shaped. The inner surface of the guiding member 202 is smooth and can efficiently reflect the projecting signals.

The cross section of the guiding member 202 is arc-shaped. To increase the reflection of the projecting signal, the guiding member 202 further includes a reflective layer 2022 formed on the inner surface of the guiding member 202. The reflective layer 2022 also can be formed on the outer surface of the guiding member 202 if the projecting signal can directly pass through the guiding member 202.

In assembly, the edge detecting apparatus 20 encircles the periphery of the bottom surface of the main body 10 such that the inner surface of the guiding member 202 faces the surface 30. The guiding member 202 is spaced from the surface 30 with a reasonable short distance to define a signal channel 2021 allowing the projecting signals to transmit with small signal loss. The emitter 201 and the receiver 203 are received in the inner surface of the guiding member 202 and pointing in two opposite directions correspondingly. When the signal channel 2021 is completely over the surface 30, the projecting signals emitted from the emitter 201 are repeatedly reflected by the surface 30 and the inner surface of the guiding member 202. By repeated reflections, the signal travels around the guiding member 202. However, when the signal channel 2021 is partially or fully over an edge of the surface 30, some of or all of the projecting signals will escape in the empty space beyond the edge of the surface 30 and as a result, some or no reflected signal arrives at the receiver 203.

In one example of the guiding member 202, the inner radius r of the cross section of the guiding member 202 is about 8 mm (millimeter). The radius R of the guiding member 202 is about 70 mm. The height from the top of the guiding member 202 to the surface 30 is about 8.9 mm.

The automatic device 100 includes a control system 40 received in the main body 10. The control system 40 is configured for controlling the motion of the automatic device 100 according to detecting results of the edge detecting apparatus 20.

In operation, when the automatic device 100 moves on the surface 30, the edge detecting apparatus 20 is activated. A projected signal is repeatedly emitted by the emitter 201 and a reflected signal is repeatedly received by the receiver 203 correspondingly. If there is an edge below the automatic device 100 the projected signal will escape the signal channel 2021 via the edge, and the receiver 203 will not receive a corresponding reflected signal. Correspondingly, the edge detecting apparatus 20 deems that an edge exists below the automatic device 100 and the control system 40 controls the automatic device 100 to turn based upon the detecting results of the edge detecting apparatus 20.

The edge detecting apparatus 20 can detect edge(s) of a surface using only one emitter and one receiver. Thus the cost of the automatic device 100 is reduced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An edge detecting apparatus for using in an automatic device and configured for detecting edges of a surface on which the automatic device moves, the edge detecting apparatus comprising:
    an emitter configured for emitting projecting signals;
    a guiding member surrounding the automatic device, the guiding member and the surface defining a signal channel, the signal channel being configured for guiding the projecting signals emitted from the emitter to travel around the automatic device if no edge of the surface exists below the signal channel; and
    a receiver configured for receiving the projecting signals.

2. The edge detecting apparatus as claimed in claim 1, wherein the emitter is an infrared emitter, and the receiver is an infrared receiver.

3. The edge detecting apparatus as claimed in claim 1, wherein the emitter is an ultrasonic emitter, and the receiver is an ultrasonic receiver.

4. The edge detecting apparatus as claimed in claim 1, wherein the guiding member is ring-shaped, and the cross section of the guiding member is arc-shaped.

5. The edge detecting apparatus as claimed in claim 4, wherein the guiding member comprises a reflective layer formed on the inner surface thereof.

6. The edge detecting apparatus as claimed in claim 5, wherein the inner radius of the cross section of the guiding member is 8 mm, and the radius of the guiding member is 70 mm.

7. An automatic device capable of automatically moving on a surface, comprising:
- a movable main body, and
- an edge detecting apparatus for detecting edges of the surface, the edge detecting apparatus comprising:
   - an emitter configured for emitting projecting signals;
   - a guiding member surrounding the automatic device, the guiding member and the surface defining a signal channel, the signal channel being configured for guiding the projecting signals emitted from the emitter to travel around the automatic device if no edge of the surface exists under the signal channel; and
   - a receiver configured for receiving the projecting signals.

8. The automatic device as claimed in claim 7, the main body comprising a control system configured for controlling the motion of the automatic device according to the detecting result of the edge detecting apparatus.

9. The automatic device as claimed in claim 8, wherein the emitter is an infrared emitter, and the receiver is an infrared receiver.

10. The automatic device as claimed in claim 8, wherein the emitter is an ultrasonic emitter, and the receiver is an ultrasonic receiver.

11. The automatic device as claimed in claim 8, wherein the guiding member is ring-shaped, and the cross section of the guiding member is arc-shaped.

12. The automatic device as claimed in claim 11, wherein the guiding member comprises a reflective layer formed on the inner surface thereof.

13. The automatic device as claimed in claim 12, wherein the inner radius of the cross section of the guiding member is 8 mm, the radius of the guiding member is 70 mm, and the height from the top of the guiding member to the surface is 8.9 mm.

* * * * *